US007552793B2

(12) United States Patent
Okuda et al.

(10) Patent No.: US 7,552,793 B2
(45) Date of Patent: Jun. 30, 2009

(54) POWER OUTPUT APPARATUS, MOTOR VEHICLE EQUIPPED WITH POWER OUTPUT APPARATUS, AND CONTROL METHOD OF POWER OUTPUT APPARATUS

(75) Inventors: Koichi Okuda, Susono (JP); Takashi Ohta, Susono (JP); Hiroaki Ebuchi, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 224 days.

(21) Appl. No.: 11/632,714

(22) PCT Filed: May 31, 2006

(86) PCT No.: PCT/JP2006/311370

§ 371 (c)(1),
(2), (4) Date: Jan. 18, 2007

(87) PCT Pub. No.: WO2006/129866

PCT Pub. Date: Dec. 7, 2006

(65) Prior Publication Data

US 2008/0083579 A1 Apr. 10, 2008

(30) Foreign Application Priority Data

Jun. 1, 2005 (JP) ............................. 2005-161616

(51) Int. Cl.
*B60K 1/00* (2006.01)
(52) U.S. Cl. .................... 180/293; 180/54.1; 701/54
(58) Field of Classification Search ................ 180/65.2, 180/65.3, 65.4, 65.8, 65.6, 293, 300, 54.1; 701/54, 112, 66, 53; 903/903, 914, 922, 903/923, 925
See application file for complete search history.

(56) References Cited

U.S. PATENT DOCUMENTS

| 4,486,838 | A  | * | 12/1984 | Itoh et al. ...................... 701/66 |
| 4,682,519 | A  | * | 7/1987  | Okada et al. ................... 477/48 |
| 5,722,502 | A  | * | 3/1998  | Kubo ......................... 180/65.4 |
| 6,730,000 | B1 | * | 5/2004  | Leising et al. .............. 477/110 |
| 6,836,718 | B2 | * | 12/2004 | Hasfjord et al. ............... 701/54 |
| 6,926,639 | B2 | * | 8/2005  | Hopper ....................... 477/110 |
| 7,108,630 | B2 | * | 9/2006  | Ozeki et al. ..................... 477/3 |
| 7,150,333 | B2 | * | 12/2006 | Noda et al. ................. 180/65.2 |

(Continued)

FOREIGN PATENT DOCUMENTS

JP  H06-038304  2/1994

(Continued)

*Primary Examiner*—Hau V Phan
(74) *Attorney, Agent, or Firm*—Oliff & Berridge, PLC

(57) ABSTRACT

A power output apparatus that outputs power to a driveshaft, the power output apparatus includes an internal combustion engine, a change-speed transmission mechanism, a connection disconnection structure, a power shaft rotation speed measurement unit, an input shaft rotation speed measurement unit, a start connection control module, and a start connection control module controlling at least one of the internal combustion engine and the change-speed transmission mechanism to make the power shaft rotation speed of the internal combustion engine approach to the input shaft rotation speed of the change-speed transmission mechanism, and controlling the connection disconnection structure to connect the power shaft of the internal combustion engine with the input shaft of the change-speed transmission mechanism at the set fluid supply start timing.

19 Claims, 8 Drawing Sheets

U.S. PATENT DOCUMENTS

2003/0045988 A1    3/2003    Suzuki et al.

FOREIGN PATENT DOCUMENTS

| | | |
|---|---|---|
| JP | A 2000-35122 | 2/2000 |
| JP | A 2002-349310 | 12/2002 |
| JP | A 2003-74683 | 3/2003 |
| JP | A-2003-212004 | 7/2003 |
| JP | A-2003-252082 | 9/2003 |
| WO | WO 2004/102041 A1 | 11/2004 |

* cited by examiner

US 7,552,793 B2

POWER OUTPUT APPARATUS, MOTOR VEHICLE EQUIPPED WITH POWER OUTPUT APPARATUS, AND CONTROL METHOD OF POWER OUTPUT APPARATUS

TECHNICAL FIELD

The present invention relates to a power output apparatus, a motor vehicle equipped with the power output apparatus, and a control method of the power output apparatus.

BACKGROUND ART

One proposed power output apparatus is mounted on a vehicle that is equipped with an engine and a hydraulically-driven clutch to connect and disconnect the power transmission from the engine to drive wheels (see, for example, Japanese Patent Laid-Open Gazette No. 2003-74683). When the engine is separated from the power transmission to the drive wheels by means of the clutch and stops, this proposed power output apparatus performs a low pressure control to regulate the hydraulic pressure to a low hydraulic pressure level immediately before generation of an engagement force in the clutch. Upon satisfaction of engine restart conditions other than a vehicle start request, the power output apparatus performs feedback control to regulate the hydraulic pressure level immediately before generation of the engagement force in the clutch, based on the rotation speeds on both ends of the clutch. In response to a vehicle start request, the power output apparatus learns the regulated hydraulic pressure by feedback control as a hydraulic pressure for a next cycle of the low pressure control.

DISCLOSURE OF THE INVENTION

This proposed power output apparatus ensures quick engagement of the clutch in response to a vehicle start request, but requires the continuous low pressure control to keep the low hydraulic pressure level even in the stop state of the engine. This leads to the requirement for continuous actuation of an electric oil pump and undesirably lowers the total energy efficiency of the whole power output apparatus. This prior art power output apparatus does not specifically taken into account an engagement timing of the clutch.

The power output apparatus of the invention, the vehicle equipped with the power output apparatus, and the control method of the power output apparatus thus aim to connect an internal combustion engine with a transmission at an appropriate timing. The power output apparatus of the invention, the vehicle equipped with the power output apparatus, and the control method of the power output apparatus also aim to reduce the potential shocks possibly arising in the connection of the internal combustion engine with the transmission. The power output apparatus of the invention, the vehicle equipped with the power output apparatus, and the control method of the power output apparatus further aim to enhance the total energy efficiency of the power output apparatus or the vehicle.

In order to attain at least part of the above and the other related objects, the power output apparatus of the invention, the vehicle equipped with power output apparatus of the invention, and the control method of the power output apparatus have the configurations discussed below.

The present invention is directed to a power output apparatus that outputs power to a driveshaft. The power output apparatus includes: an internal combustion engine that has a power shaft and outputs power; a change-speed transmission mechanism that has an input shaft connected to the power shaft of the internal combustion engine and an output shaft connected to the drive shaft and works to convert the output power of the internal combustion engine and transmit the converted power to the output shaft; a connection disconnection structure that utilizes a hydraulic pressure of an operating fluid to connect and disconnect the power shaft of the internal combustion engine with and from the input shaft of the change-speed transmission mechanism; a power shaft rotation speed measurement unit that measures a power shaft rotation speed or a rotation speed of the power shaft of the internal combustion engine in the connection disconnection structure;

an input shaft rotation speed measurement unit that measures an input shaft rotation speed or a rotation speed of the input shaft of the transmission mechanism in the connection disconnection structure; a start connection control module that, in response to a start-engagement operation command to restart the internal combustion engine and connect the power shaft of the internal combustion engine with the input shaft of the change-speed transmission mechanism from a stop state of the internal combustion engine and a disconnected state of the power shaft of the internal combustion engine from the input shaft of the change-speed transmission mechanism, controls the internal combustion engine to start, sets a fluid supply start timing to start a supply of the operating fluid to the connection disconnection structure, based on the measured power shaft rotation speed of the internal combustion engine and the measured input shaft rotation speed of the change-speed transmission mechanism, said start connection control module controlling at least one of the internal combustion engine and the change-speed transmission mechanism to make the power shaft rotation speed of the internal combustion engine approach to the input shaft rotation speed of the change-speed transmission mechanism, and controlling the connection disconnection structure to connect the power shaft of the internal combustion engine with the input shaft of the change-speed transmission mechanism at the set fluid supply start timing.

In response to a start-engagement operation command to restart the internal combustion engine and connect the power shaft of the internal combustion engine with the input shaft of the change-speed transmission mechanism from a stop state of the internal combustion engine and a disconnected state of the power shaft of the internal combustion engine from the input shaft of the change-speed transmission mechanism, the power output apparatus of the invention controls the internal combustion engine to start, sets a fluid supply start timing to start a supply of the operating fluid to the connection disconnection structure, based on the power shaft rotation speed or the rotation speed of the power shaft of the internal combustion engine and the input shaft rotation speed or the rotation speed of the input shaft of the change-speed transmission mechanism in the connection disconnection structure. The power output apparatus also controls at least one of the internal combustion engine and the change-speed transmission mechanism to make the power shaft rotation speed of the internal combustion engine approach to the input shaft rotation speed of the change-speed transmission mechanism, and controls the connection disconnection structure to connect the power shaft of the internal combustion engine with the input shaft of the change-speed transmission mechanism at the set fluid supply start timing. The connection disconnection structure is controlled to connect the power shaft of the internal combustion engine with the input shaft of the change-speed transmission mechanism at the fluid supply start timing of the operating fluid, which is set based on the power shaft rotation speed of the internal combustion engine and the input shaft rotation speed of the change-speed transmission, mechanism. Such control enables connection of the power shaft of the internal combustion engine with the input shaft of the change-speed transmission mechanism at an adequate timing by the connection disconnection structure. This arrangement effectively reduces the potential shocks possibly arising in the connection of the power shaft of the internal combustion engine with the input shaft of the change-speed transmission mechanism.

In one preferable embodiment of the invention, the power output apparatus further includes an acceleration-deceleration request setting unit that sets an acceleration-deceleration request to rotation of the driveshaft. The start connection control module controls at least one of the internal combustion engine and the change-speed transmission mechanism based on the set acceleration-deceleration request to make the power shaft rotation speed of the internal combustion engine approach to the input shaft rotation speed of the change-speed transmission mechanism. This arrangement ensures connection of the internal combustion engine with the change-speed transmission mechanism corresponding to the acceleration-deceleration request. In the power output apparatus of this preferable embodiment, when the set acceleration-deceleration request represents an acceleration requirement, the start connection control module may control at least one of the internal combustion engine and the change-speed transmission mechanism to increase the power shaft rotation speed of the internal combustion engine above the input shaft rotation speed of the change-speed transmission mechanism by a preset first rotation speed. When the set acceleration-deceleration request represents a deceleration requirement, the start connection control module may control at least one of the internal combustion engine and the change-speed transmission mechanism to decrease the power shaft rotation speed of the internal combustion engine below the input shaft rotation speed of the change-speed transmission mechanism by a preset second rotation speed. Such control gives a rotation speed difference-based acceleration or deceleration in a direction of the acceleration-deceleration request, in the control of the connection disconnection structure to connect the power shaft of the internal combustion engine with the input shaft of the change-speed transmission mechanism. The start connection control module may control at least one of the internal combustion engine and the change-speed transmission mechanism with the preset first rotation speed and the preset second rotation speed, based on a magnitude of the set acceleration-deceleration request. This arrangement gives a rotation speed difference-based acceleration or deceleration corresponding to the acceleration-deceleration request, in the control of the connection disconnection structure to connect the power shaft of the internal combustion engine with the input shaft of the change-speed transmission mechanism.

In another preferable embodiment of the invention, the power output apparatus further includes: a rotation behavior detection unit that detects a rotation behavior of the driveshaft; and a learning module that learns the fluid supply start timing based on the rotation behavior of the driveshaft detected by the rotation behavior detection unit, in the control of the connection disconnection structure to connect the power shaft of the internal combustion engine with the input shaft of the change-speed transmission mechanism. This arrangement enables the connection disconnection structure to connect the power shaft of the internal combustion engine with the input shaft of the change-speed transmission mechanism at the fluid supply start timing set to an adequate timing, even when the connection disconnection structure has some ageing variation or individual variation. In the power output apparatus of this preferable embodiment, the learning module may delay the fluid supply start timing in response to detection of a behavior for accelerating rotation of the driveshaft in the control of the connection disconnection structure to connect the power shaft of the internal combustion engine with the input shaft of the change-speed transmission mechanism. The learning module may advance the fluid supply start timing in response to detection of a behavior for decelerating the rotation of the driveshaft in the control of the connection disconnection structure to connect the power shaft of the internal combustion engine with the input shaft of the change-speed transmission mechanism. The rotation behavior detection unit may detect the rotation behavior of the driveshaft based on a rotation speed of the driveshaft or may detect the rotation behavior of the driveshaft based on a preset physical quantity convertible to the rotation speed of the driveshaft. For example, when the power output apparatus of this structure is mounted on a vehicle, the rotation speed of the driveshaft may be detected based on the speed of the vehicle.

In one preferable application of the invention, the power output apparatus further includes: a fluid temperature measurement unit that measures temperature of the operating fluid; and a timing correction module that corrects the fluid supply start timing, based on the measured temperature of the operating fluid. This arrangement enables connection of the power shaft of the internal combustion engine with the input shaft of the change-speed transmission mechanism at an adequate timing according to the measured temperature of the operating fluid.

In another preferable application of the invention, the power output apparatus further includes: an acceleration-deceleration behavior detection unit that detects an acceleration-deceleration behavior regarding acceleration or deceleration of rotation of the driveshaft; and a driving force correction module that corrects a driving force output to the driveshaft based on the acceleration-deceleration behavior detected by the acceleration-deceleration behavior detection unit, in the control of the connection disconnection structure to connect the power shaft of the internal combustion engine with the input shaft of the change-speed transmission mechanism. This arrangement effectively reduces the potential shocks possibly arising in the course of connection of the power shaft of the internal combustion engine with the input shaft of the change-speed transmission mechanism. The acceleration-deceleration behavior detection unit may detect the acceleration-deceleration behavior based on a rotation speed of the driveshaft or may detect the acceleration-deceleration behavior based on a preset physical quantity convertible to the acceleration or the deceleration of the rotation of the driveshaft. For example, when the power output apparatus of this structure is mounted on a vehicle, the acceleration-deceleration behavior maybe detected based on the acceleration of the vehicle.

The present invention is directed to a vehicle including: an internal combustion engine that has a power shaft and outputs power to the one axle; a change-speed transmission mechanism that has an input shaft connected to the power shaft of the internal combustion engine and an output shaft connected to the one axle and works to convert the output power of the internal combustion engine and transmit the converted power to the output shaft; a connection disconnection structure that utilizes a hydraulic pressure of an operating fluid to connect and disconnect the power shaft of the internal combustion engine with and from the input shaft of the change-speed transmission mechanism; a power shaft rotation speed measurement unit that measures a power shaft rotation speed or a rotation speed of the power shaft of the internal combustion engine in the connection disconnection structure;

an input shaft rotation speed measurement unit that measures an input shaft rotation speed or a rotation speed of the input shaft of the transmission mechanism in the connection disconnection structure; a start connection control module that, in response to a start-engagement operation command to restart the internal combustion engine and connect the power shaft of the internal combustion engine with the input shaft of the change-speed transmission mechanism from a stop state of the internal combustion engine and a disconnected state of the power shaft of the internal combustion engine from the input shaft of the change-speed transmission mechanism, controls the internal combustion engine to start, sets a fluid supply start timing to start a supply of the operating fluid to the connection disconnection structure, based on the measured power shaft rotation speed of the internal combustion engine and the measured input shaft rotation speed of the change-speed transmission mechanism, said start connection control module controlling at least one of the internal combustion engine and the change-speed transmission mechanism to make the power shaft rotation speed of the internal combustion engine approach to the input shaft rotation speed of the change-speed transmission mechanism, and controlling the connection disconnection structure to connect the power shaft of the internal combustion engine with the input shaft of the change-speed transmission mechanism at the set fluid supply start timing.

In response to a start-engagement operation command to restart the internal combustion engine and connect the power shaft of the internal combustion engine with the input shaft of the change-speed transmission mechanism from a stop state of the internal combustion engine and a disconnected state of the power shaft of the internal combustion engine from the input shaft of the change-speed transmission mechanism, the vehicle of the invention controls the internal combustion engine to start, sets a fluid supply start timing to start a supply of the operating fluid to the connection disconnection structure, based on the power shaft rotation speed or the rotation speed of the power shaft of the internal combustion engine and the input shaft rotation speed or the rotation speed of the input shaft of the change-speed transmission mechanism in the connection disconnection structure. The vehicle also controls at least one of the internal combustion engine and the change-speed transmission mechanism to make the power shaft rotation speed of the internal combustion engine approach to the input shaft rotation speed of the change-speed transmission mechanism, and controls the connection disconnection structure to connect the power shaft of the internal combustion engine with the input shaft of the change-speed transmission mechanism, at the set fluid supply start timing. The connection disconnection structure is controlled to connect the power shaft of the internal combustion engine with the input shaft of the change-speed transmission mechanism at the fluid supply start timing of the operating fluid, which is set based on the power shaft rotation speed of the internal combustion engine and the input shaft rotation speed of the change-speed transmission mechanism. Such control enables connection of the power shaft of the internal combustion engine with the input shaft of the change-speed transmission mechanism at an adequate timing by the connection disconnection structure. This arrangement effectively reduces the potential shocks possibly arising in the connection of the power shaft of the internal combustion engine with the input shaft of the change-speed transmission mechanism.

In one preferable embodiment of the invention, the vehicle further includes: an acceleration measurement unit that measures an acceleration of the vehicle; and a driving force correction module that corrects a driving force required for the vehicle based on the acceleration measured by the acceleration measurement unit, in the control of the connection disconnection structure to connect the power shaft of the internal combustion engine with the input shaft of the change-speed transmission mechanism. This arrangement effectively prevents an unexpected acceleration or deceleration in the course of connection of the power shaft of the internal combustion engine with the input shaft of the change-speed transmission mechanism. In the vehicle of this embodiment, the driving force correction module may correct the driving force required for the vehicle in a direction of canceling out the measured acceleration. The driving force correction module may correct a driving force output from the internal combustion engine. In one preferable structure of this embodiment, the vehicle further has: a motor that is capable of outputting power to the one axle or another axle different from the one axle. In this structure, the driving force correction module corrects a driving force output from the motor.

In one preferable embodiment of the invention, the vehicle further includes an acceleration-deceleration request setting unit that sets an acceleration-deceleration request to rotation of the one axle. The start connection control module controls at least one of the internal combustion engine and the change-speed transmission mechanism based on the set acceleration-deceleration request to make the power shaft rotation speed of the internal combustion engine approach to the input shaft rotation speed of the change-speed transmission mechanism. This arrangement ensures connection of the internal combustion engine with the change-speed transmission mechanism corresponding to the acceleration-deceleration request. In the vehicle of this preferable embodiment, when the set acceleration-deceleration request represents an acceleration requirement, the start connection control module may control at least one of the internal combustion engine and the change-speed transmission mechanism to increase the power shaft rotation speed of the internal combustion engine above the input shaft rotation speed of the change-speed transmission mechanism by a preset first rotation speed. When the set acceleration-deceleration request represents a deceleration requirement, the start connection control module may control at least one of the internal combustion engine and the change-speed transmission mechanism to decrease the power shaft rotation speed of the internal combustion engine below the input shaft rotation speed of the change-speed transmission mechanism by a preset second rotation speed. Such control gives a rotation speed difference-based acceleration or deceleration in a direction of the acceleration-deceleration request, in the control of the connection disconnection structure to connect the power shaft of the internal combustion engine with the input shaft of the change-speed transmission mechanism. The start connection control module may control at least one of the internal combustion engine and the change-speed transmission mechanism with the preset first rotation speed and the preset second rotation speed, based on a magnitude of the set acceleration-deceleration request. This arrangement gives a rotation speed difference-based acceleration or deceleration corresponding to the acceleration-deceleration request, in the control of the connection disconnection structure to connect the power shaft of the internal combustion engine with the input shaft of the change-speed transmission mechanism.

In another preferable embodiment of the invention, the power output apparatus further includes: a rotation behavior detection unit that detects a rotation behavior of the one axle;

and a learning module that learns the fluid supply start timing based on the rotation behavior of the driveshaft detected by the rotation behavior detection unit, in the control of the connection disconnection structure to connect the power shaft of the internal combustion engine with the input shaft of the change-speed transmission mechanism. This arrangement enables the connection disconnection structure to connect the power shaft of the internal combustion engine with the input shaft of the change-speed transmission mechanism at the fluid supply start timing set to an adequate timing, even when the connection disconnection structure has some ageing variation or individual variation. In the power output apparatus of this preferable embodiment, the learning module may delay the fluid supply start timing in response to detection of a behavior for accelerating rotation of the driveshaft in the control of the connection disconnection structure to connect the power shaft of the internal combustion engine with the input shaft of the change-speed transmission mechanism. The learning module may advance the fluid supply start timing in response to detection of a behavior for decelerating the rotation of the driveshaft in the control of the connection disconnection structure to connect the power shaft of the internal combustion engine with the input shaft of the change-speed transmission mechanism. The rotation behavior detection unit may detect the rotation behavior of the one axle based on a rotation speed of the one axle or may detect the rotation behavior of the one axle based on a preset physical quantity convertible to the rotation speed of the one axle. For example, when the power output apparatus of this structure is mounted on a vehicle, the rotation speed of the one axle may be detected based on the speed of the vehicle.

The present invention is directed to a control method of power output apparatus including an internal combustion engine that has a power shaft and outputs power; a change-speed transmission mechanism that has an input shaft connected to the power shaft of the internal combustion engine and an output shaft connected to the drive shaft and works to convert the output power of the internal combustion engine and transmit the converted power to the output shaft; and a connection disconnection structure that utilizes a hydraulic pressure of an operating fluid to connect and disconnect the power shaft of the internal combustion engine with and from the input shaft of the change-speed transmission mechanism, said control method controlling the power output apparatus to restart the internal combustion engine and connect the power shaft of the internal combustion engine with the input shaft of the change-speed transmission mechanism from a stop state of the internal combustion engine and a disconnected state of the power shaft of the internal combustion engine from the input shaft of the change-speed transmission mechanism, said control method including the steps of controlling the internal combustion engine to start; setting a fluid supply start timing to start a supply of the operating fluid to the connection disconnection structure, based on a power shaft rotation speed or a rotation speed of the power shaft of the internal combustion engine and an input shaft rotation speed or a rotation speed of the input shaft of the change-speed transmission mechanism in the connection disconnection structure; controlling at least one of the internal combustion engine and the change-speed transmission mechanism to make the power shaft rotation speed of the internal combustion engine approach to the input shaft rotation speed of the change-speed transmission mechanism; and controlling the connection disconnection structure to connect the power shaft of the internal combustion engine with the input shaft of the change-speed transmission mechanism at the set fluid supply start timing.

The present invention of a control method of power output apparatus including the steps of controlling the internal combustion engine to start; setting a fluid supply start timing to start a supply of the operating fluid to the connection disconnection structure, based on a power shaft rotation speed or a rotation speed of the power shaft of the internal combustion engine and an input shaft rotation speed or a rotation speed of the input shaft of the change-speed transmission mechanism in the connection disconnection structure; controlling at least one of the internal combustion engine and the change-speed transmission mechanism to make the power shaft rotation speed of the internal combustion engine approach to the input shaft rotation speed of the change-speed transmission mechanism; and controlling the connection disconnection structure to connect the power shaft of the internal combustion engine with the input shaft of the change-speed transmission mechanism at the set fluid supply start timing. The connection disconnection structure is controlled to connect the power shaft of the internal combustion engine with the input shaft of the change-speed transmission mechanism at the fluid supply start timing of the operating fluid, which is set based on the power shaft rotation speed of the internal combustion engine and the input shaft rotation speed of the change-speed transmission mechanism. Such control enables connection of the power shaft of the internal combustion engine with the input shaft of the change-speed transmission mechanism at an adequate timing by the connection disconnection structure. This arrangement effectively reduces the potential shocks possibly arising in the connection of the power shaft of the internal combustion engine with the input shaft of the change-speed transmission mechanism.

BEST MODES OF CARRYING OUT THE INVENTION

Figure 1:
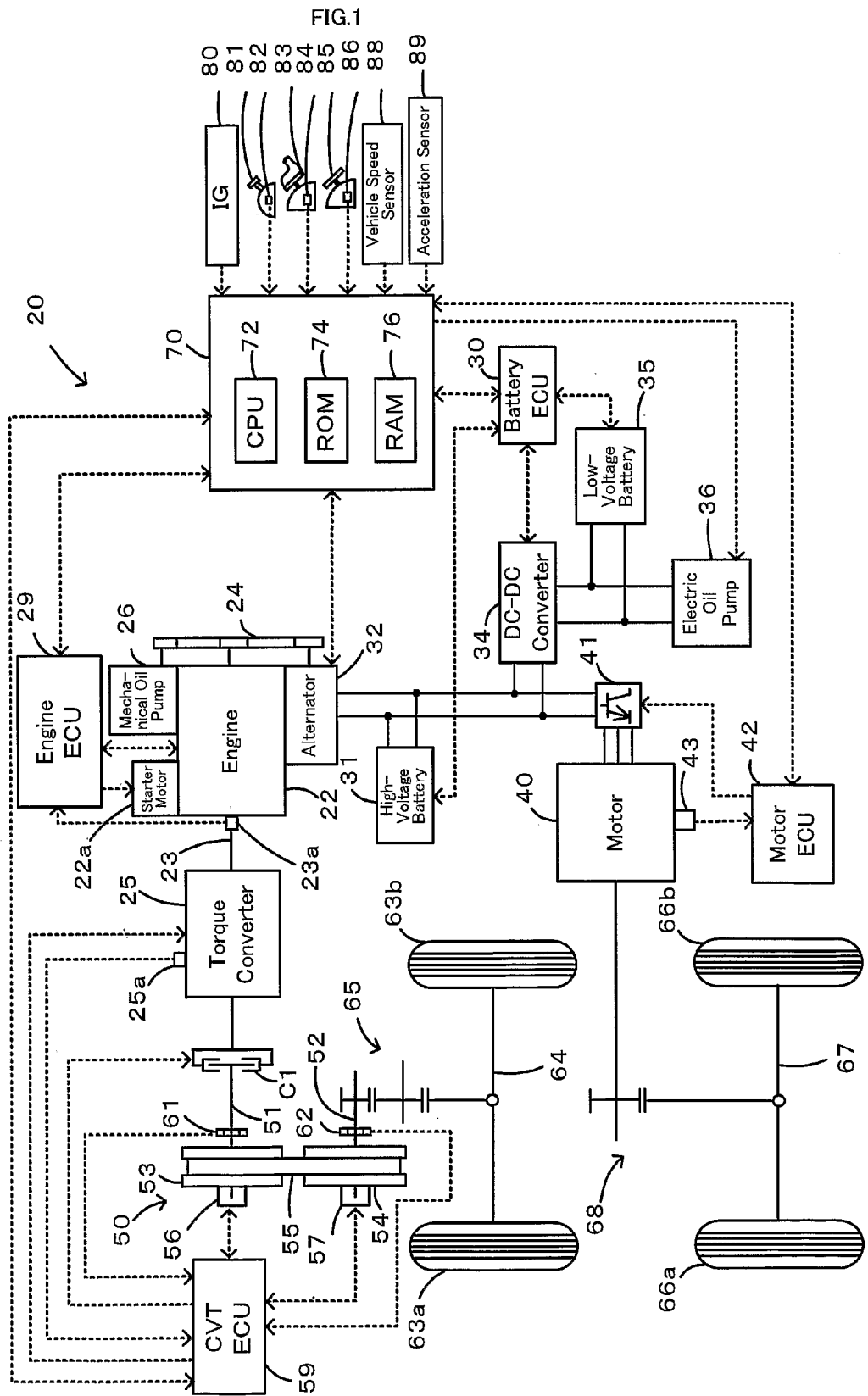
FIG. 1 schematically illustrates the configuration of a hybrid vehicle equipped with a power output apparatus in one embodiment of the invention.

One mode of carrying out the invention is discussed below as a preferred embodiment with reference to the accompanied drawings. FIG. 1 schematically illustrates the configuration of a hybrid vehicle 20 equipped with a power output apparatus in one embodiment of the invention. The hybrid vehicle 20 of the embodiment is a four-wheel drive vehicle and has a front-wheel drive system of transmitting the output power of an engine 22 to a front axle 64 via a torque converter 25, a continuously variable transmission (CVT) 50, and a gear mechanism 65 to drive front wheels 63a and 63b, a rear wheel drive system of transmitting the output power of a motor 40 to a rear axle 67 via a gear mechanism 68 to drive rear wheels 66a and 66b, and a hybrid electronic control unit 70 of controlling the operations of the whole hybrid vehicle 20. A clutch C1 is provided between the torque converter 25 and the CVT 50 to connect and disconnect the engine 22 with and from the CVT 50. The hybrid vehicle 20 also includes a mechanical oil pump 26 that consumes the output power of the engine 22 and generates hydraulic line pressures to actuate the CVT 50 and the clutch C1, and an electric oil pump 36 that is actuated with electric power supplied from a low-voltage battery 35.

The engine 22 is an internal combustion engine consuming a hydrocarbon fuel, such as gasoline or light oil, to output power. A starter motor 22a is attached to a crankshaft 23 of the engine 22. An alternator 32 and the mechanical oil pump 26 are also connected to the crankshaft 23 via a belt 24. An engine electronic control unit 29 (hereafter referred to as engine ECU 29) controls the operations of the engine 22 and performs fuel injection control, ignition control, and intake air flow regulation. The engine ECU 29 establishes communication with the hybrid electronic control unit 70. The engine ECU 29 controls the operations of the engine 22 in response to control signals received from the hybrid electronic control unit 70, while outputting data regarding the operating conditions of the engine 22, for example, a rotation speed Ne of the engine 22 measured by a rotation speed sensor 23a attached to the crankshaft 23, to the hybrid electronic control unit 70 according to the requirements.

The motor 40 is constructed as a known synchronous motor generator that may be actuated both as a generator and as a motor. The motor 40 receives and transmits electric power from and to a high-voltage battery 31 via an inverter 41 and receives a supply of electric power from the alternator 32. The motor 40 is under operation control of a motor electronic control unit 42 (hereafter referred to as motor ECU 42). The motor ECU 42 receives various signals required for operating and controlling the motor 40, for example, signals from a rotational position detection sensor 43 that detects the rotational position of a rotor in the motor 40 and signals representing phase currents applied to the motor 40 from an electric current sensor (not shown). The motor ECU 42 also establishes communication with the hybrid electronic control unit 70. The motor ECU 42 outputs switching control signals to the inverter 41 in response to control signals received from the hybrid electronic control unit 70 to operate and control the motor 40, while outputting data regarding the operating conditions of the motor 40 to the hybrid electronic control unit 70 according to the requirements.

A high-voltage battery 31 is a secondary battery having a rated voltage Vh (for example, 42 [V]) and functions to accumulate electric power supplied from the alternator 32 and to transmit electric power to and from the motor 40. The low-voltage battery 35 is a secondary battery having a lower rated voltage Vl (for example, 12 [V]) than the rated voltage Vh of the high-voltage battery 31 and functions to accumulate electric power supplied from the alternator 32 via a DC-DC converter 34 and to supply electric power to auxiliary machinery and other low voltage-operating equipment (not shown).

The high-voltage battery 31, the low-voltage battery 35, and the DC-DC converter 34 are under management and control of a battery electronic control unit 30 (hereafter referred to as battery ECU 30). The battery ECU 30 receives diverse signals required for control and management of the high-voltage battery 31 and the low-voltage battery 35, for example, inter-terminal voltages, charge-discharge electric currents, and battery temperatures of the respective batteries 31 and 35 measured by relevant sensors (not shown). The battery ECU 30 also establishes communication with the hybrid electronic control unit 70 and outputs data regarding the operating conditions of the respective batteries 31 and 35 to the hybrid electronic control unit 70 according to the requirements. The battery ECU 30 computes states of charges (SOC) of the high-voltage battery 31 and the low-voltage battery 35 from integrated values of charge-discharge currents for management of the respective batteries 31 and 35.

The CVT 50 includes a primary pulley 53 that has a variable groove width and is linked to an input shaft 51, a secondary pulley 54 that has a variable groove width and is linked to an output shaft 52 or a driveshaft, a belt 55 that is set in the grooves of the primary pulley 53 and the secondary pulley 54, and hydraulic first and second actuators 56 and 57 that respectively vary the groove widths of the primary pulley 53 and the secondary pulley 54. Varying the groove widths of the primary pulley 53 and the secondary pulley 54 by the first actuator 56 and the second actuator 57 attains the continuously variable speed to convert the power of the input shaft 51 and output the converted power to the output shaft 52. The first actuator 56 is used to regulate the change gear ratio, while the second actuator 57 is used to adjust the clamping pressure of the belt 55 for regulation of a torque transmission capacity of the CVT 50.

Figure 2:
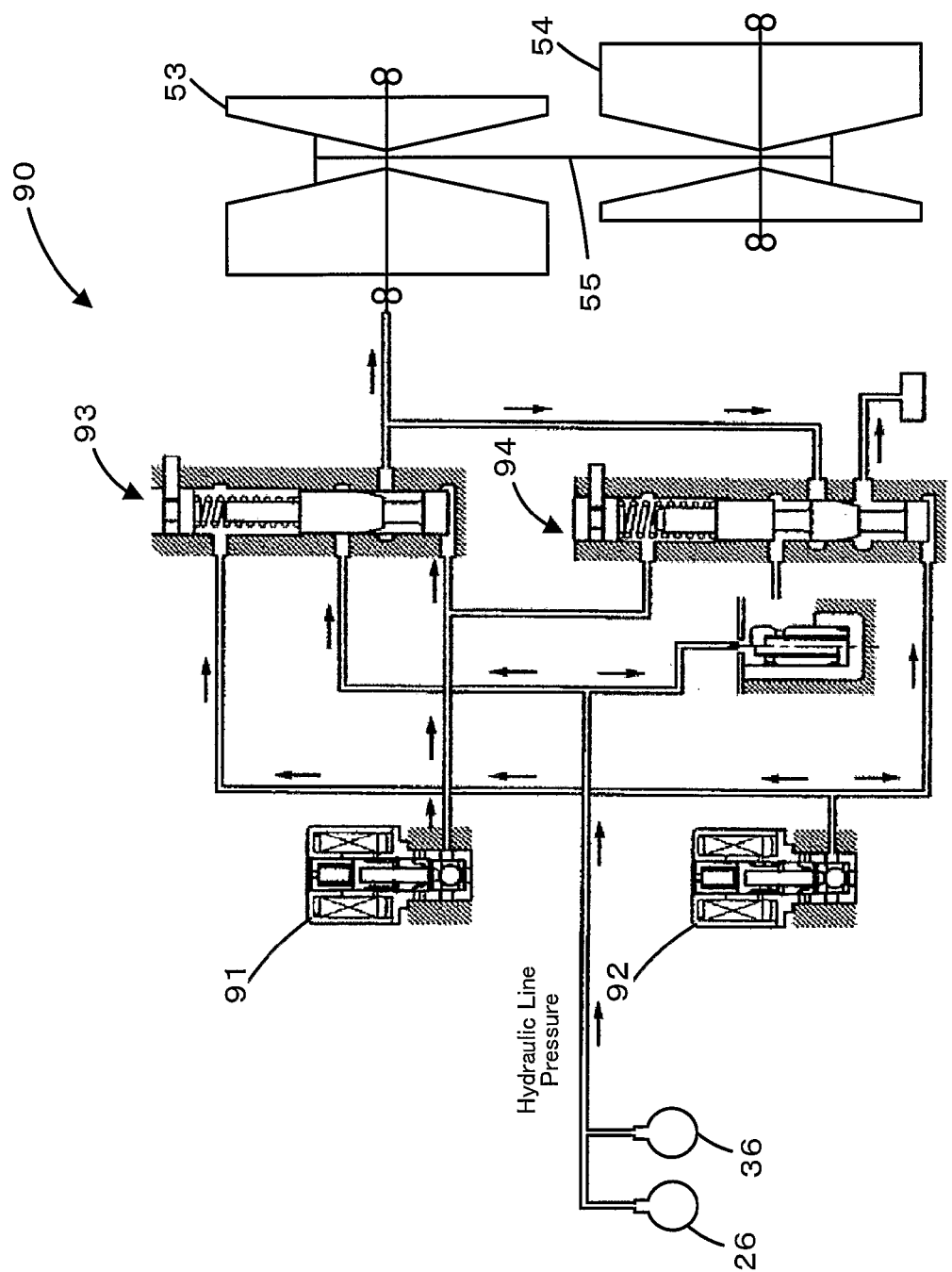
FIG. 2 schematically shows the structure of a transmission control mechanism working as a first actuator of a CVT included in the hybrid vehicle of FIG. 1.
Figure 3:
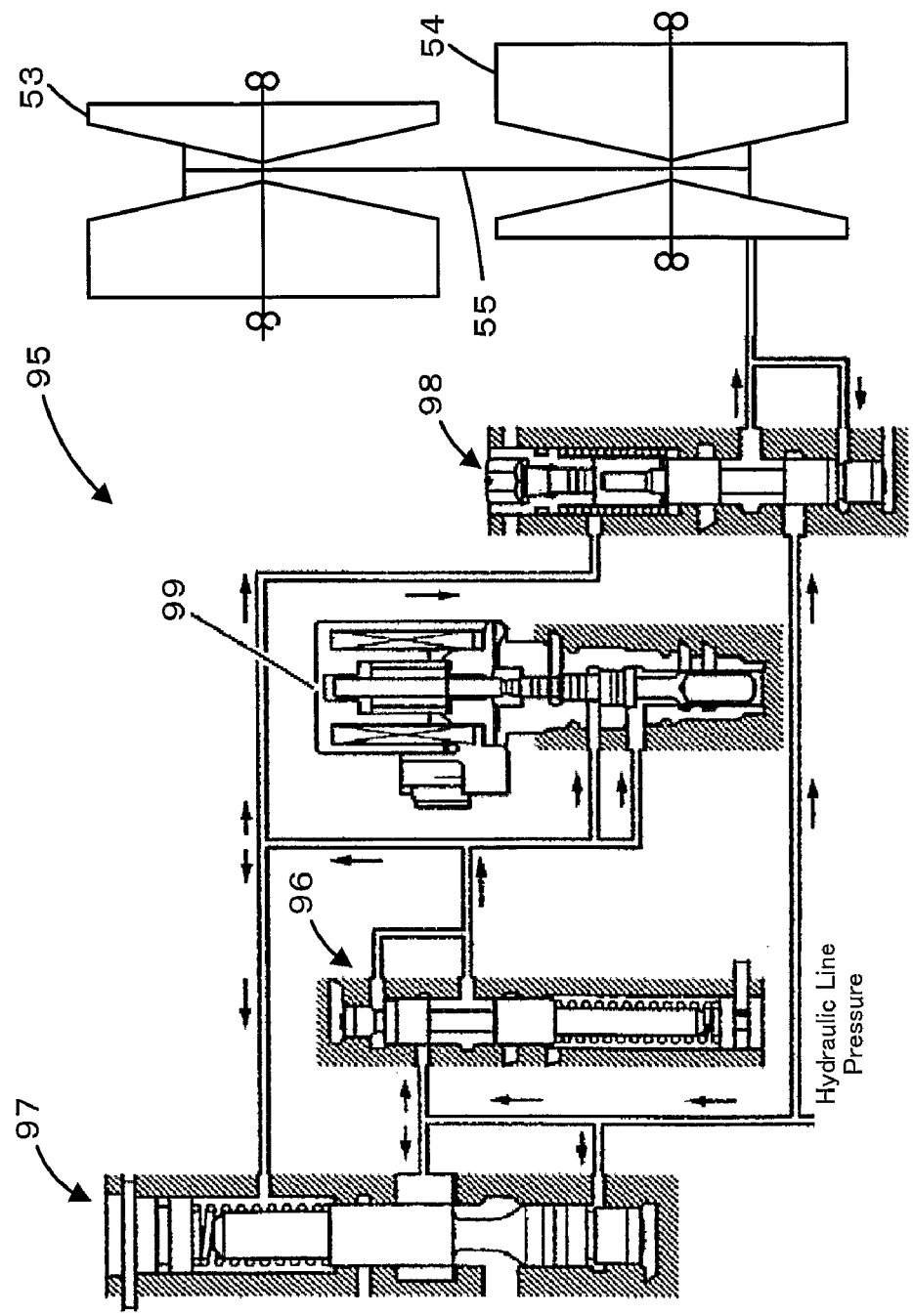
FIG. 3 schematically shows the structure of a belt clamping pressure regulation mechanism working as a second actuator of the CVT.

FIG. 2 schematically shows the structure of a transmission control mechanism 90 working as the first actuator 56. FIG. 3 schematically shows the structure of a belt clamping pressure regulation mechanism 95 working as the second actuator 57. As illustrated in FIG. 2, the transmission control mechanism 90 has duty solenoids 91 and 92 and change-speed control valves 93 and 94. Adjustment of the duty ratio of the duty solenoid 91 for regulating the change-speed control valve 94 in its opening direction and the change-speed control valve 93 in its closing direction applies a hydraulic line pressure from the mechanical oil pump 26 or from the electric oil pump 36 to the primary pulley 53 to attain an upshift of the CVT 50. Adjustment of the duty ratio of the duty solenoid 92 for regulating the change-speed control valve 93 in its closing direction and the change-speed control valve 94 in its opening direction releases the hydraulic line pressure applied on the primary pulley 53 to attain a downshift of the CVT 50. As illustrated in FIG. 3, the belt clamping pressure regulation mechanism 95 has control valves 96 and 98, a regulator 97, and a linear solenoid 99. Regulation of the linear solenoid 99 supplies an input hydraulic pressure from the control valve 96 to the regulator 97 and the control valve 98 to control the open-close positions of the regulator 97 and the control valve 98. This accordingly regulates the hydraulic line pressure and regulates the supply of hydraulic pressure to the secondary pulley 54 to adjust the clamping pressure of the belt 55.

A CVT electronic control unit 59 (hereafter referred to as CVTECU 59) takes charge of the transmission control and the belt clamping pressure regulation of the CVT 50. The CVTECU 59 receives a rotation speed Nin of the input shaft 51 from a rotation speed sensor 61 attached to the input shaft 51, a rotation speed Nout of the output shaft 52 from a rotation speed sensor 62 attached to the output shaft 52, and a turbine rotation speed Nt from a rotation speed sensor 25a attached to the torque converter 25. The CVTECU 59 outputs driving signals to the first actuator 56 (duty solenoids 91 and 92), the second actuator 57 (linear solenoid 99), and an electric motor (not shown) of the electric oil pump 36. The CVTECU 59 also establishes communication with the hybrid electronic control unit 70. The CVTECU 59 regulates the change gear ratio of the CVT 50 in response to control signals from the hybrid electronic control unit 70, while outputting data regarding the operating conditions of the CVT 50, for example, the rotation speed Nin of the input shaft 51 and the rotation speed Nout of the output shaft 52, to the hybrid electronic control unit 70 according to the requirements.

Figure 4:
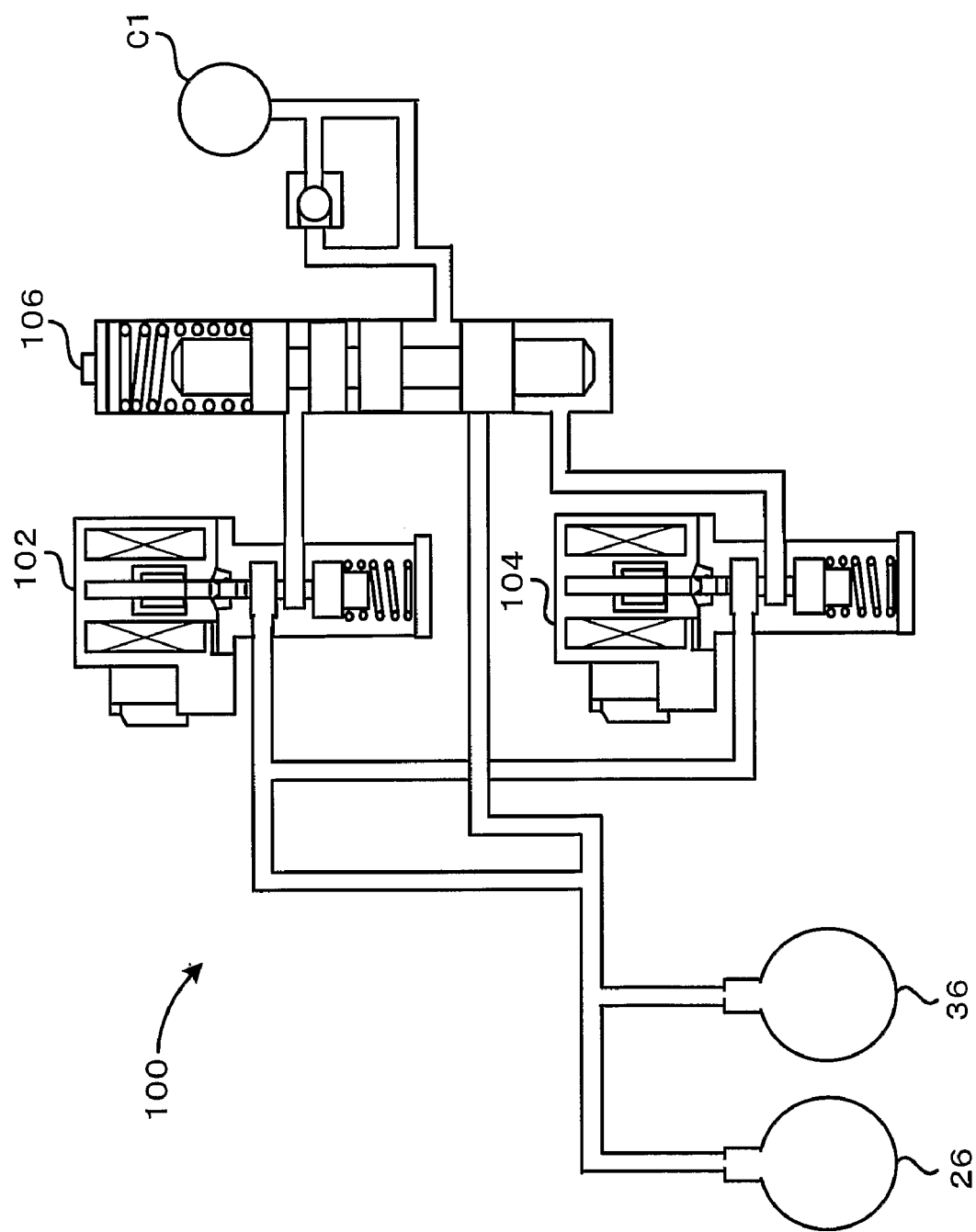
FIG. 4 schematically shows the structure of a hydraulic pressure circuit as an actuator of a clutch C1 included in the hybrid vehicle of FIG. 1.

The CVTECU 50 also controls engagement and release of the clutch C1. FIG. 4 shows the structure of a hydraulic pressure circuit 100 working as an actuator of the clutch C1. The hydraulic pressure circuit 100 has duty solenoids 102 and 104 and a shift control valve 106. In the presence of a hydraulic line pressure, the shift control valve 106 receives the hydraulic pressure from the duty solenoid 104 to shut off a line of the hydraulic line pressure to the clutch C1 and regulates the duty ratio of the duty solenoid 102 to regulate the supply of hydraulic pressure to the clutch C1. In the absence of a hydraulic line pressure, on the other hand, the shift control valve 106 directly supplies the hydraulic pressure to the clutch C1. Namely actuation of the electric oil pump 36 in the absence of a hydraulic line pressure directly supplies the operating oil from the electric oil pump 36 to the clutch C1.

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, a vehicle speed V from a vehicle speed sensor 88, and an acceleration α from an acceleration sensor 89. The hybrid electronic control unit 70 outputs, via its output port, control signals to the alternator 32 and driving signals to the electric motor (not shown) of the electric oil pump 36. The hybrid electronic control unit 70 transmits various control signals and data to and from the engine ECU 29, the battery ECU 30, the motor ECU 42, and the CVTECU 59.

The hybrid vehicle 20 of the embodiment having the construction described above runs in a four-wheel drive mode in response to the driver's depression of the accelerator pedal 83, with output of the primary power from the engine 22 to the front wheels 63a and 63b and output of the auxiliary power from the motor 40 to the rear wheels 66a and 66b according to the requirements. The four-wheel drive mode is set, for example, on the occasion of an abrupt acceleration in response to the driver's heavy depression of the accelerator pedal 83 or in the skid of wheels. During deceleration of the hybrid vehicle 20 in response to the driver's depression of the brake pedal 85, the clutch C1 is released to separate the engine 22 from the CVT 50, and the engine 22 stops. The motor 40 is under regenerative control to apply a braking force to the rear wheels 66a and 66b and to recover the kinetic energy of braking converted to electric power in the high-voltage battery 31.

Figure 5:
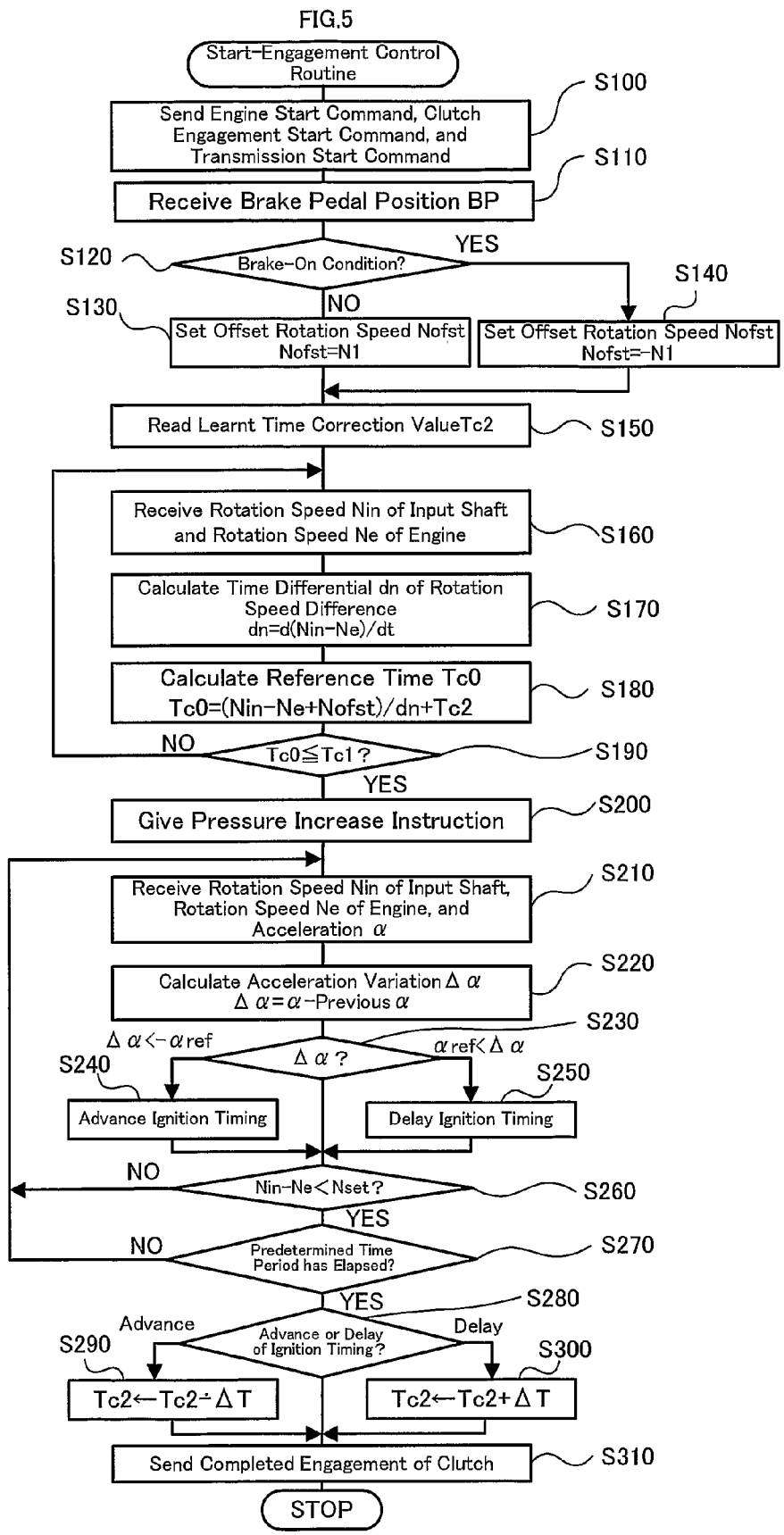
FIG. 5 is a flowchart showing a start-engagement control routine executed by a hybrid electronic control unit included in the hybrid vehicle of FIG. 1.

The description regards the operations of the hybrid vehicle 20 of the embodiment, especially a series of operations to restart the engine 22 and engage the clutch C1 from the stop state of the engine 22 and the released state of the clutch C1 (hereafter referred to as start-engagement operations). The start-engagement operations are performed in response to the driver's depression of the accelerator pedal 83 while the motor 40 is under regenerative control to apply a braking force and recover the kinetic energy of braking in the released state of the clutch C1 to separate the engine 22 from the CVT 50 and in the stop state of the engine 22 during deceleration. The start-engagement operations are also performed when the hybrid vehicle 20 under braking is in a state close to a stop and requires setup for a restart. In this embodiment, the start-engagement operations are executed by the hybrid electronic control unit 70 according to a start-engagement control routine shown in the flowchart of FIG. 5.

In the start-engagement control routine, the CPU 72 of the hybrid electronic control unit 70 first sends an engine start command to the ECU 29 to initiate engine start control for restarting the engine 22 and regulating the rotation speed Ne of the engine 22, while sending a transmission start command and a clutch engagement start command to the CVTECU 59 to initiate both variable speed control for varying the rotation speed Nin of the input shaft 51 of the CVT 50 and clutch engagement control for engaging the clutch C1 (step S100). The engine ECU 29 receiving the engine start command executes an engine start control routine shown in the flowchart of FIG. 6 to initiate the engine start control. The CVTECU 59 receiving the transmission start command and the clutch engagement start command executes a variable speed control routine shown in the flowchart of FIG. 7 to initiate the variable speed control and a clutch engagement control routine shown in the flowchart of FIG. 8 to initiate the clutch engagement control. The details of these controls will be described later.

The CPU 72 subsequently receives the brake pedal position BP from the brake pedal position sensor 86 (step S110) and identifies either the brake-on condition or the brake-off condition based on the brake pedal position BP (step S120). Upon identification of the brake-off condition, a preset positive value N1 is set to an offset rotation speed Nofst (step S130). Upon identification of the brake-on condition, on the other hand, a preset negative value –N1 is set to the offset rotation speed Nofst (step S140). The offset rotation speed Nofst represents a required rotation speed difference between the rotation speed Nin of the input shaft 51 and the rotation speed Ne of the engine 22. The offset rotation speed Nofst is specified to make the direction of a potential torque variation arising in the course of engagement of the clutch C1 corresponding to the driver's acceleration or deceleration request and accordingly protect the driver from feeling something is wrong. The positive value of the offset rotation speed Nofst means setting a higher rotation speed Ne of the engine 22 than the rotation speed Nin of the input shaft 51. The preset value N1 is a relatively low rotation speed, for example, 50 rpm or 100 rpm.

After setting the offset rotation speed Nofst, the CPU 72 reads a time correction value Tc2, which has been learnt in a previous cycle of this control routine, from a specific area of the RAM 76 (step S150) and receives the rotation speed Nin of the input shaft 51 and the rotation speed Ne of the engine 22 (step S160). The CPU 72 then calculates a time differential dn of the rotation speed difference between the input rotation speed Nin of the input shaft 51 and the input rotation speed Ne of the engine 22 (step S170). A reference time Tc0 is calculated according to Equation (1), which sums up the offset rotation speed Nofst and the rotation speed difference between the rotation speed Nin of the input shaft 51 and the rotation speed Ne of the engine 22, divides the sum by the time differential dn, and adds the input time correction value Tc2 to the result of the division (step S180):

$$Tc0=(Nin-Ne+Nofst)/dn+Tc2$$

Until the calculated reference time Tc0 decreases to or below a required hydraulic pressure change time Tc1 (step S190), the processing of steps S160 to S180 is repeated to input the rotation speeds Nin and Ne and calculate the reference time Tc0. The rotation speed Nin of the input shaft 51 is measured by the rotation speed sensor 61 and is received from the CVTECU 59 by communication. The rotation speed Ne of the engine 22 is measured by the rotation speed sensor 23a and is received from the engine ECU 29 by communication. The reference time Tc0 is obtained by adding the time correction value Tc2 to the time period required for making the rotation speed difference between the rotation speed Nin of the input shaft 51 and the rotation speed Ne of the engine 22 equal to the offset rotation speed Nofst as shown in Equation (1) given above. The time correction value Tc2 corrects an ageing or another variation in engagement timing of the clutch C1 as described later. The required hydraulic pressure change time Tc1 is experimentally or otherwise determined as a required time period for an increase of the actual hydraulic pressure to a specific hydraulic pressure level Pc1 after output of a hydraulic pressure application command to the clutch C1. The specific hydraulic pressure level Pc1 has a clutch capacity that allows for a variation in clutch transmission torque while keeping the rotation speed of the input shaft of the clutch C1 at a fixed value. The process of waiting for the decrease of the reference time Tc0 to or below the required hydraulic pressure change time Tc1 is thus equivalent to determination of whether the time period required for making the rotation speed difference between the rotation speed Nin of the input shaft 51 and the rotation speed Ne of the engine 22 equal to the offset rotation speed Nofst decreases to or below the time period required for making the actual hydraulic pressure of the clutch C1 reach the specific hydraulic pressure level Pc1 having the clutch capacity to allow for a variation in clutch transmission torque by taking into account the ageing variation of the clutch C1. Starting an increase in hydraulic pressure applied to the clutch C1 at this timing makes the rotation speed difference between the rotation speed Nin of the input shaft 51 and the rotation speed Ne of the engine 22 equal to the offset rotation speed Nofst when the actual hydraulic pressure of the clutch C1 reaches the specific hydraulic pressure level Pc1. In response to a decrease of the reference time Tc0 to or below the required hydraulic pressure change time Tc1 at step S190, the CPU 72 gives a pressure increase instruction to the CVTECU 59 to increase the hydraulic pressure applied to the clutch C1 (step S200). The start timing of the hydraulic pressure increase is given by subtraction of the time correction value Tc2 from the required hydraulic pressure change time Tc1 by taking into account the ageing variation of the clutch C1. This result of the subtraction is set to a pressure increase start timing. The start of increasing the hydraulic pressure at the timing when the reference time Tc0 decreases to or below the required hydraulic pressure change time Tc1 is thus equivalent to the start of increasing the hydraulic pressure applied to the clutch C1 when the result of the subtraction of the time correction value Tc2 from the reference time Tc0 reaches the pressure increase start timing.

After the output of the pressure increase instruction, the CPU 72 receives the rotation speed Nin of the input shaft 51, the rotation speed Ne of the engine 22, and the acceleration $\alpha$ (step S210) and subtracts a previous acceleration $\alpha$ (previous $\alpha$) input at step S210 in a previous cycle of this control routine from the currently input acceleration $\alpha$ to calculate an acceleration variation $\Delta\alpha$ (step S220). The ignition timing of the engine 22 is advanced or delayed to vary the output torque of the engine 22 in a direction of canceling out the calculated acceleration variation $\Delta\alpha$ (steps S230 to S250) Until the rotation speed difference between the input rotation speed Nin of the input shaft 51 and the input rotation speed Ne of the engine 22 is continuously below a preset threshold value Nset for engagement of the clutch C1 for a predetermined time period, for example, 0.5 seconds (steps S260 and S270), the processing of steps S210 to S270 is repeated to calculate the acceleration variation $\Delta\alpha$ and advance or delay the ignition timing of the engine 22 in the direction of canceling out the acceleration variation $\Delta\alpha$. The engine 22 starts at a delayed ignition timing from a specific ignition timing for generating a maximum torque by the engine start control described later. The output torque of the engine 22 is thus increased by advancing the ignition timing and decreased by delaying the ignition timing. When the acceleration variation $\Delta\alpha$ is greater than a preset positive threshold value $\alpha$ref (step S230), the hybrid vehicle 20 is under acceleration. The ignition timing of the engine 22 is thus delayed to decrease the output torque of the engine 22 (step S250). When the acceleration variation $\Delta\alpha$ is smaller than a preset negative threshold value $-\alpha$ref (step S230), the hybrid vehicle 20 is under deceleration. The ignition timing of the engine 22 is thus advanced to increase the output torque of the engine 22 (step S240). The degree of advance or the degree of delay may be set according to the frequency of repetition of the processing or may be set by multiplying the magnitude of the acceleration variation $\Delta\alpha$ by a preset gain. The preset threshold value $\alpha$ref is used for identifying the acceleration or the deceleration of the hybrid vehicle 20 and is thus set sufficiently close to 0. When the acceleration variation $\Delta\alpha$ is not smaller than the preset negative threshold value $-\alpha$ref and not greater than the preset positive threshold value $\alpha$ref (step S230), the CPU 72 neither advances nor delays the ignition timing of the engine 22 and accordingly keeps the current level of the output torque of the engine 22.

When the rotation speed difference between the input rotation speed Nin of the input shaft 51 and the input rotation speed Ne of the engine 22 is continuously below the preset threshold value Nset for engagement of the clutch C1 for the predetermined time period (steps S260 and S270), in the event of either the advance or the delay of the ignition timing of the engine 22 (steps S280), the CPU 72 updates the time correction value Tc2 and writes the updated time correction value Tc2 into the specific area of the RAM 76 (step S290 or S300). After sending information regarding the completed engagement of the clutch C1 to the engine ECU 29 and the CVTECU 59 (step S310), the CPU 72 terminates this start-engagement control routine of FIG. 5. In response to the advance of the ignition timing of the engine 22 (step S280), the time correction value Tc2 is decreased by a preset very short time $\Delta T$ to advance the pressure increase timing of the hydraulic pressure applied to the clutch C1 and accordingly control a potential deceleration of the hybrid vehicle 20, which may arise in the course of engagement of the clutch C1 (step S290). In response to the delay of the ignition timing of the engine 22 (step S280), on the other hand, the time correction value Tc2 is increased by the preset very short time $\Delta T$ to delay the pressure increase timing of the hydraulic pressure applied to the clutch C1 and accordingly control a potential acceleration of the hybrid vehicle 20, which may arise in the course of engagement of the clutch C1 (step S300). The update of the time correction value Tc2 in this manner desirably reduces a potential acceleration variation of the hybrid vehicle 20, which possibly occurs in the course of engagement of the clutch C1 in a next cycle of the start-engagement operations.

Figure 6:
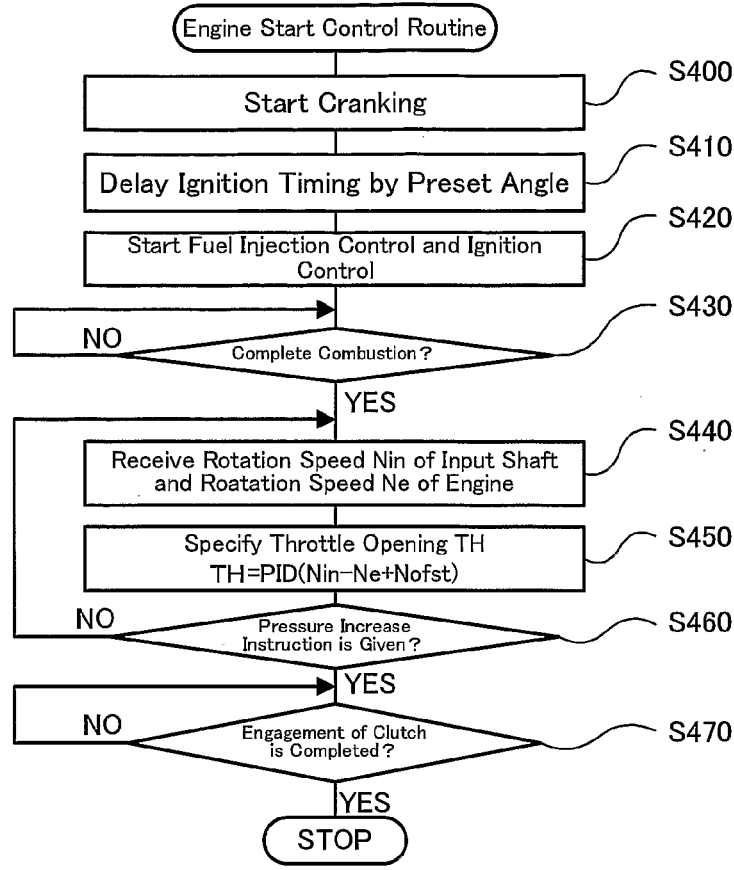
FIG. 6 is a flowchart showing an engine start control routine executed by an engine ECU included in the hybrid vehicle of FIG. 1.

The engine ECU 29 executes the engine start control routine shown in the flowchart of FIG. 6, in response to the engine start command sent from the hybrid electronic control unit 70. The engine ECU 29 first controls the starter motor 22a to start engine cranking (step S400), delays the ignition timing of the engine 22 from the specific ignition timing for generating the maximum torque by a preset angle (step S410), starts fuel injection control and ignition control (step S420) and waits until complete combustion of the air-fuel mixture in the engine 22 (step S430). The angle of delay of the ignition timing is set to ensure a smooth start of the engine 22 and to enable a decrease in output torque of the engine 22 by a further delay of the ignition timing.

In response to complete combustion (step S430), the engine ECU 29 receives the rotation speed Nin of the input shaft 51 and the rotation speed Ne of the engine 22 from the rotation speed sensor 23a (step S440) and sets a throttle opening TH to make the rotation speed difference between the rotation speed Nin of the input shaft 51 and the rotation speed Ne of the engine 22 equal to the offset rotation speed Nofst (step S450). The engine ECU 29 then drives and controls a throttle motor (not shown) to attain the set throttle opening TH. The processing of steps S440 and S450 is repeated to input the rotation speeds Nin and Ne and set the throttle opening TH until the pressure increase instruction is given to increase the hydraulic pressure applied to the clutch C1 (step S460). The rotation speed Nin of the input shaft 51 is measured by the rotation speed sensor 61 and is received from the CVTECU 59 by communication. This series of control processing causes the rotation speed difference between the rotation speed Nin of the input shaft 51 and the rotation speed Ne of the engine 22 to eventually reach the offset rotation speed Nofst. In response to the output of the pressure increase instruction to increase the hydraulic pressure applied to the clutch C1, the engine ECU 29 waits until completed engagement of the clutch C1 (step S470) while keeping the throttle opening TH at the current setting level. The engine ECU 29 then terminates this engine start control routine of FIG. 6. In response to the output of the pressure increase instruction to increase the hydraulic pressure applied to the clutch C1, the throttle opening TH is not updated any longer but is kept at the current setting level to make the rotation speed Nin of the input shaft 51 and the rotation speed Ne of the engine 22 equal to the offset rotation speed Nofst. The engagement of the clutch C1 decreases the rotation speed difference below the offset rotation speed Nofst. The continuous update of the throttle opening TH in this condition would increase the throttle opening TH to keep the rotation speed difference equal to the offset rotation speed Nofst. The engine start control routine of this embodiment avoids such an increase of the throttle opening TH but enables engagement of the clutch C1 in the state that the rotation speed difference between the rotation speed Nin of the input shaft 51 and the rotation speed Ne of the engine 22 is equal to the offset rotation speed Nofst.

Figure 7:
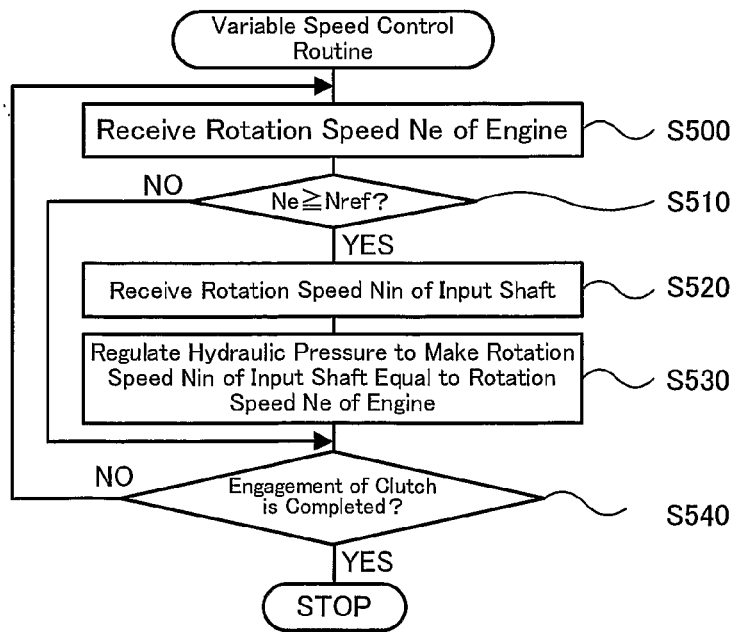
FIG. 7 is a flowchart showing a variable speed control routine executed by a CVTECU included in the hybrid vehicle of FIG. 1.

The CVTECU 59 executes the variable speed control routine shown in the flowchart of FIG. 7, in response to the transmission start command sent from the hybrid electronic control unit 70. The CVTECU 59 first receives the rotation speed Ne of the engine 22 (step S500) and compares the input rotation speed Ne of the engine 22 with a preset reference speed Nref, which represents a rotation speed allowing for a variation in change gear ratio of the CVT 50 (step S510). When the input rotation speed Ne of the engine 22 is lower than the preset reference speed Nref (step S510: No), the CVTECU 59 determines whether the engagement of the clutch C1 has been completed (step S540). The rotation speed Ne of the engine 22 is measured by the rotation speed sensor 23a and is received from the engine ECU 29 by communication. These input and comparison steps are repeated until completion of engagement of the clutch C1, while the rotation speed Ne of the engine 22 is below the preset reference speed Nref (steps S500, S510, and S540). In some condition of the rotation speed Nin of the input shaft 51, engagement of the clutch C1 may be completed without a variation in change gear ratio of the CVT 50. In this case, the CVTECU 59 exits from this variable speed control routine of FIG. 7 without any further processing. When the rotation speed Ne of the engine 22 increases to or above the preset reference speed Nref (step S510: Yes), the CVTECU 59 receives the rotation speed Nin of the input shaft 51 from the rotation speed sensor 61 (step S520) and regulates the hydraulic pressure to attain a required change gear ratio of the CVT 50' for making the input rotation speed Nin equal to the rotation speed Ntag of the engine 22 (step S530). The processing of steps S520 and S530 is repeated until completion of the engagement of the clutch C1 (step S540). The CVTECU 59 terminates this variable speed control routine of FIG. 7 on the completed engagement of the clutch C1. The change gear ratio of the CVT 50 is varied to an upshift, since the rotation speed Nin of the input shaft 51 is generally higher than the preset reference speed Nref. The transmission control mechanism 90 adjusts the duty ratio of the duty solenoid 91 to regulate the change-speed control valve 93 in its opening direction and to regulate the change-speed control valve 94 in its closing direction. This applies the hydraulic line pressure from either the mechanical oil pump 26 or the electric oil pump 36 to the primary pulley 53 to upshift the CVT 50. In the event of a variation of the change gear ratio of the CVT 50 to a downshift, on the contrary, the transmission control mechanism 90 adjusts the duty ratio of the duty solenoid 92 to regulate the change-speed control valve 93 in its closing direction and to regulate the change-speed control valve 94 in its opening direction. This releases the hydraulic line pressure applied to the primary pulley 53. As described above, the rotation speed Nin of the input shaft 51 is varied by regulation of the hydraulic pressure, which is not so quick as the motor control.

Figure 8:
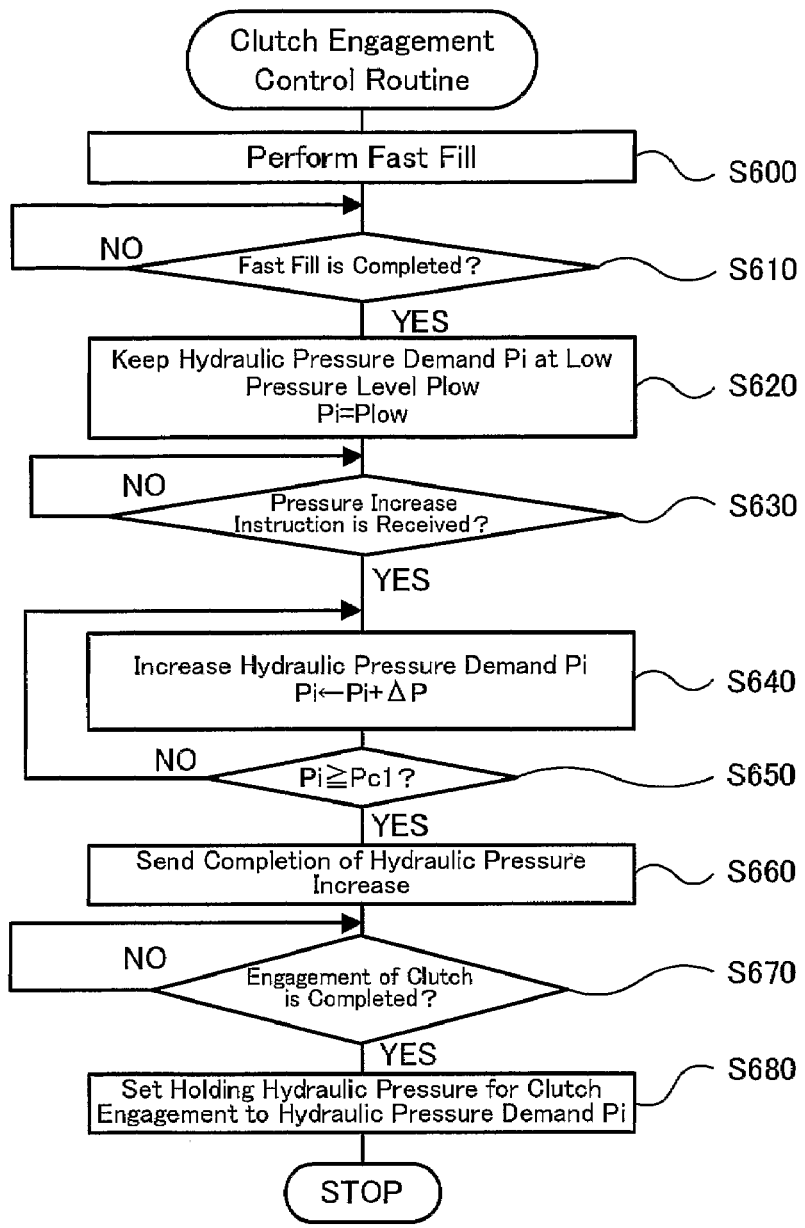
FIG. 8 is a flowchart showing a clutch engagement control routine executed by the CVTECU.

The CVTECU 59 executes the clutch engagement control routine shown in the flowchart of FIG. 8, in response to the clutch engagement start command sent from the hybrid electronic control unit 70. The CVTECU 59 first performs a fast-fill operation to fill a cylinder of the clutch C1 with a relatively high hydraulic pressure of operating oil (step S600). The fast fill directly supplies the hydraulic pressure from the electric oil pump 36 to the clutch C1 until the rotation speed Ne of the engine 22 reaches the preset reference speed Nref. After the rotation speed Ne of the engine 22 reaches the preset reference speed Nref, the fast fill adjusts the duty ratio of the duty solenoid 102 to supply the hydraulic pressure from the mechanical oil pump 26 to the clutch C1. In response to completion of the fast fill operation (step S610), the CVTECU 59 sets a hydraulic pressure demand Pi to a low pressure level Plow that does not generate an engagement force in the clutch C1 (step S620), and waits until receiving the pressure increase instruction from the hybrid electronic control unit 70 (step S200 in the start-engagement control routine of FIG. 5) (step S630). When receiving the pressure increase instruction from the hybrid electronic control unit 70 (step S630: Yes), the CVTECU 59 gradually increases the hydraulic pressure demand Pi by every preset very small hydraulic pressure AP to repeatedly update the hydraulic pressure demand Pi (step S640) until the hydraulic pressure demand Pi reaches the specific hydraulic pressure level Pc1 having the clutch capacity that allows for a variation in clutch transmission torque (step S650). When the hydraulic pressure demand Pi reaches the specific hydraulic pressure level Pc1 (step S650: Yes), the CVTECU 59 sends information regarding completion of the hydraulic pressure increase to the hybrid electronic control unit 70 (step S660) The very small hydraulic pressure AP for the gradual increase of the hydraulic pressure demand Pi is determined according to the frequency of repetition of the processing. When receiving the information regarding the completed engagement of the clutch C1 from the hybrid electronic control unit 70 (step S670), the CVTECU 59 sets the hydraulic pressure demand Pi to a holding hydraulic pressure (for example, maximum hydraulic pressure) for engagement of the clutch C1 (step S680) and exits from this clutch engagement control routine of FIG. 8.

Figure 9:
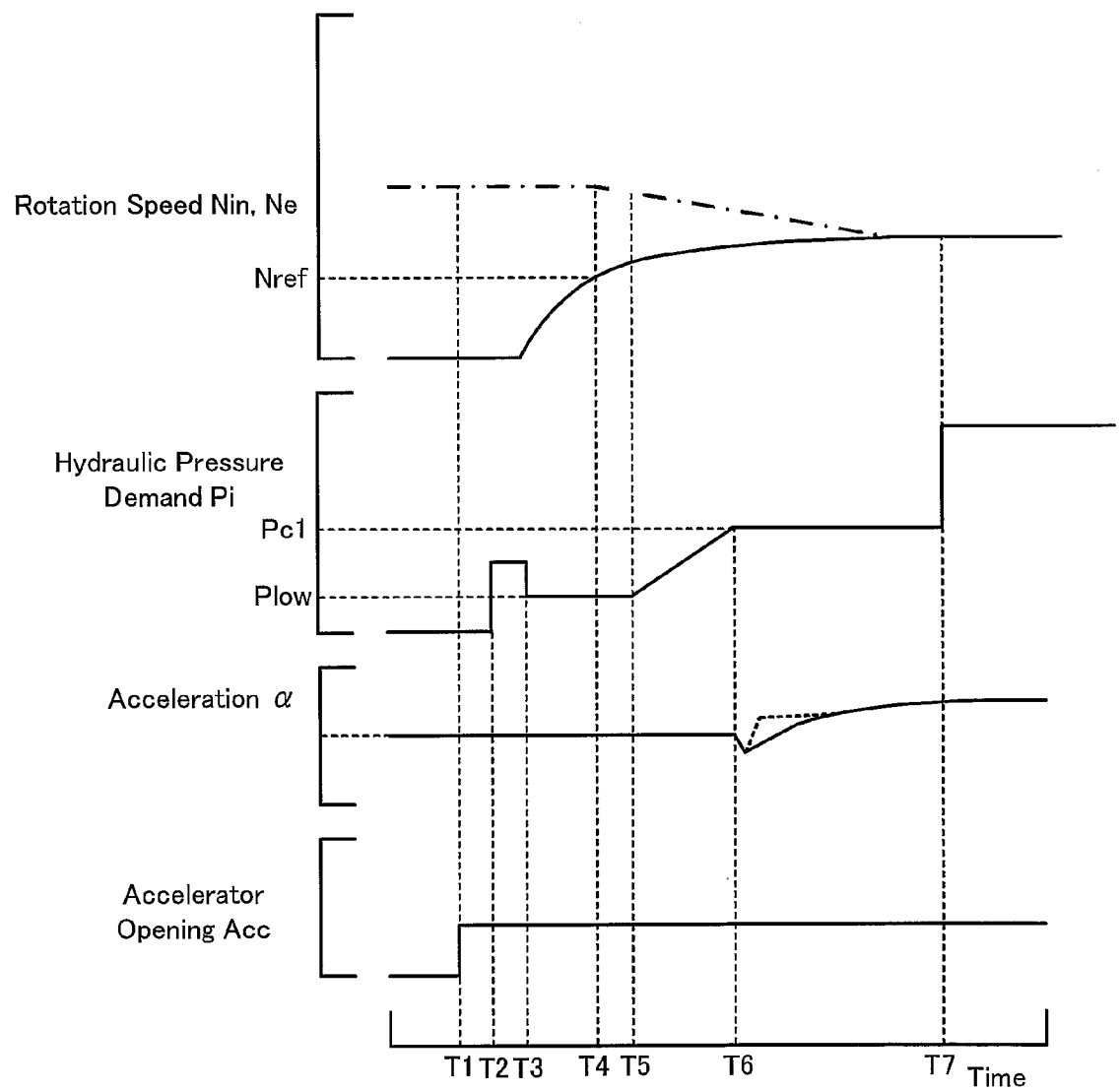
FIG. 9 shows time variations in rotation speed Nin of an input shaft, rotation speed Ne of an engine, hydraulic pressure demand Pi to the clutch C1, acceleration α of the hybrid vehicle, and accelerator opening Acc, in response to a start-engagement operation command.

FIG. 9 shows time variations in rotation speed Nin of the input shaft 51, rotation speed Ne of the engine 22, hydraulic pressure demand Pi to the clutch C1, acceleration α of the hybrid vehicle 20, and accelerator opening Acc, in response to a start-engagement operation command. In the illustrated example of FIG. 9, the hybrid electronic control unit 70 starts the start-engagement control in response to a start-engagement operation command given at a time T1. The start-engagement control triggers the start control of the engine 22 executed by the engine ECU 29, while triggering the variable speed control of the CVT 50 and the engagement control of the clutch C1 executed by the CVTECU 59. The electric oil pump 36 is driven to start the fast fill to the clutch C1 at a time T2. The hydraulic pressure demand Pi is kept at the low pressure level Plow after completion of the fast fill and start of the engine 22 at a time T3. The CVTECU 59 varies the change gear ratio of the CVT 50 at a time T4 when the rotation speed Ne of the engine 22 increases to the preset reference speed Nref. The hybrid electronic control unit 70 gives the pressure increase instruction to increase the hydraulic pressure applied to the clutch C1 at a time T5 when the reference time Tc0 decreases to or below the required hydraulic pressure change time Tc1. On or after a time T6 when the actual hydraulic pressure of the clutch C1 reaches the specific hydraulic pressure level Pd1, in response to the acceleration variation Δα below the preset negative threshold value −αref or above the preset positive threshold value αref, the ignition timing of the engine 22 is advanced or delayed to reduce a variation in acceleration α of the hybrid vehicle 20. The engine 22 is controlled to make the rotation speed difference between the rotation speed Nin of the input shaft 51 and the rotation speed Ne of the engine 22 equal to the offset rotation speed Nofst. As light variation of the acceleration α is accordingly in the driver's expected direction and protects the driver from feeling something is wrong. The engagement of the clutch C1 is completed at a time T7 when the rotation speed difference between the rotation speed Nin of the input shaft 51 and the rotation speed Ne of the engine 22 is continuously below the preset threshold value Nset for engagement of the clutch C1 for the predetermined time period.

As described above, in response to a start-engagement operation command, the hybrid vehicle 20 of the embodiment starts increasing the hydraulic pressure applied to the clutch C1 when the reference time Tc0 decreases to or below the required hydraulic pressure change time Tc1. Here the reference time Tc0 is calculated from the previously learnt time correction value Tc2 and the rotation speed difference between the rotation speed Nin of the input shaft 51 and the rotation speed Ne of the engine 22. Such hydraulic pressure control enables engagement of the clutch C1 at an adequate timing. This effectively reduces the potential shocks due to a variation in acceleration of the hybrid vehicle 20 possibly arising in the course of engagement of the clutch C1 and prevents unnecessary energy consumption, thus enhancing the total energy efficiency of the whole hybrid vehicle 20. The time correction value Tc2 is updated according to the variation in acceleration of the hybrid vehicle 20 possibly arising in the course of engagement of the clutch C1. Such learning of the time correction value Tc2 effectively corrects the engagement timing of the clutch C1, which may be varied by ageing or another cause, to an adequate level. In the event of some variation in acceleration of the hybrid vehicle 20 possibly occurring in the course of engagement of the clutch C1, the engine 22 has the advanced or delayed ignition timing to ensure output of the torque in the direction of canceling out the variation. Such advance or delay of the ignition timing desirably reduces the variation in acceleration of the hybrid vehicle 20 that may arise in the course of engagement of the clutch C1.

In response to a start-engagement operation command, the hybrid vehicle 20 of the embodiment starts engagement of the clutch C1 under control of the engine 22 to make the rotation speed difference between the rotation speed Nin of the input shaft 51 and the rotation speed Ne of the engine 22 equal to the offset rotation speed Nofst, which is set to satisfy the driver's acceleration or deceleration request. The acceleration or the deceleration of the hybrid vehicle 20 in the course of engagement of the clutch C1 is thus in the driver's expected direction and accordingly protects the driver from feeling something is wrong.

In response to a start-engagement operation command, the hybrid vehicle 20 of the embodiment sets the offset rotation speed Nofst corresponding to the brake-on condition or the brake-off condition identified by the brake pedal position BP. Here the offset rotation speed Nofst represents the required rotation speed difference between the rotation speed Nin of the input shaft 51 and the rotation speed Ne of the engine 22 for the engagement of the clutch C1. The offset rotation speed Nofst may be set to satisfy the driver's acceleration or deceleration request by any other technique. For example, the offset rotation speed Nofst may be set corresponding to the accelerator-on condition or the accelerator-off condition identified by the accelerator opening Acc or may be set according to a variation in driving force demand for the hybrid vehicle 20 based on the accelerator opening Acc and the vehicle speed V. The offset rotation speed Nofst is not restricted to the preset value N1 but may be varied according to the magnitude of the driving force or the braking force. Another possible modification may not set the offset rotation speed Nofst corresponding to the driver's acceleration or deceleration request. Namely a value '0' is set to the required rotation speed difference between the rotation speed Nin of the input shaft 51 and the rotation speed Ne of the engine 22 for the engagement of the clutch C1.

In the event of a variation in acceleration possibly arising in the course of engagement of the clutch C1, the hybrid vehicle 20 of the embodiment advances or delays the ignition timing of the engine 22 to ensure output of the torque from the engine 22 in the direction of canceling out the variation. The torque in the direction of canceling out the variation in acceleration of the hybrid vehicle 20 may alternatively be output from the motor 40. This motor control may be performed in parallel with the advance or delay of the ignition timing of the engine 22. Such torque control in the direction of canceling out the variation in acceleration may be omitted if not required.

The hybrid vehicle 20 of the embodiment updates the time correction value Tc2 according to the variation in acceleration possibly arising in the course of engagement of the clutch C1. Such learning of the time correction value Tc2 may be omitted if not required. The time correction value Tc2 may be updated according to the measured temperature of the operating oil supplied as the hydraulic pressure to the clutch C1 and the measured temperature of the outside air. The higher temperature of the operating oil and the higher temperature of the outside air lower the viscosity of the operating oil and shorten the pressure increase time to increase the hydraulic pressure applied to the clutch C1. The time correction value Tc2 may thus be updated to a greater value with an increase in temperature of the operating oil or in temperature of the outside air.

The hybrid vehicle 20 of the embodiment controls the engagement of the clutch C1 based on the rotation speed Nin of the input shaft 51 and the rotation speed Ne of the engine 22. In one modified structure, rotation speed sensors are provided on both sides of the clutch C1 between the engine 22 and the CVT 50. The control of the engagement of the clutch C1 may be based on the rotation speed of the clutch C1 on the side of the engine 22 (engine-side rotation speed) and the rotation speed of the clutch C1 on the side of the CVT 50 (CVT-side rotation speed) measured by the respective rotation speed sensors.

In response to a start-engagement operation command, the hybrid vehicle 20 of the embodiment controls the engine 22 with setting the throttle opening TH to make the rotation speed difference between the rotation speed Nin of the input shaft 51 and the rotation speed Ne of the engine 22 equal to the offset rotation speed Nost. One modified procedure may set a synchronizing rotation speed Ntag for engagement of the clutch C1 corresponding to the accelerator opening Acc and the vehicle speed V and vary the change gear ratio of the CVT 50 to make the rotation speed Nin of the input shaft 51 equal to the synchronizing rotation speed Ntag, The modified procedure may also control the engine 22 with setting the throttle opening TH to make the rotation speed Ne of the engine 22 different from the synchronizing rotation speed Ntag by the offset rotation speed Nofst.

In the structure of the hybrid vehicle 20 of the embodiment, the clutch C1 is located between the torque converter 25 and the CVT 50. The clutch maybe provided between the torque converter 25 and the engine 22.

The hybrid vehicle 20 of the embodiment is designed to output the power of the motor 40 to the rear axle 67. The structure of the hybrid vehicle 20 may be modified to output the power of the motor 40 to the front axle 64 or may be designed without the motor 40.

In the hybrid vehicle 20 of the embodiment, the belt CVT 50 is applied for the transmission. This belt CVT 50 may be replaced by a toroidal or any other continuous variable transmission or even by a stepped transmission.

The embodiment regards the hybrid vehicle 20 equipped with the power output apparatus of the invention. The power output apparatus of the invention may be mounted on variety of other moving bodies including diverse vehicles, ships and boats, and aircraft, as well as automobiles or may be built in stationary equipment, such as construction machines. The technique of the invention is not restricted to the power output apparatus or the vehicle equipped with the power output apparatus but may also be actualized by a control method of the power output apparatus or a control method of the vehicle equipped with the power output apparatus.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the invention is preferably applicable to the manufacturing industries of power output apparatuses and vehicles.

The invention claimed is:

1. A power output apparatus that outputs power to a driveshaft, said power output apparatus comprising:
    an internal combustion engine that has a power shaft and outputs power;
    a change-speed transmission mechanism that has an input shaft connected to the power shaft of the internal combustion engine and an output shaft connected to the drive shaft and works to convert the output power of the internal combustion engine and transmit the converted power to the output shaft of the change-speed transmission mechanism;
    a connection disconnection structure that utilizes a hydraulic pressure of an operating fluid to connect and disconnect the power shaft of the internal combustion engine with and from the input shaft of the change-speed transmission mechanism;
    a power shaft rotation speed measurement unit that measures a power shaft rotation speed or a rotation speed of the power shaft of the internal combustion engine in the connection disconnection structure;
    an input shaft rotation speed measurement unit that measures an input shaft rotation speed or a rotation speed of the input shaft of the transmission mechanism in the connection disconnection structure;
    a start connection control module that, in response to a start-engagement operation command to restart the internal combustion engine and connect the power shaft of the internal combustion engine with the input shaft of the change-speed transmission mechanism from a stop state of the internal combustion engine and a disconnected state of the power shaft of the internal combustion engine from the input shaft of the change-speed transmission mechanism, controls the internal combustion engine to start, sets a fluid supply start timing to start a supply of the operating fluid to the connection disconnection structure, based on the measured power shaft rotation speed of the internal combustion engine and the measured input shaft rotation speed of the change-speed transmission mechanism,
    said start connection control module controlling at least one of the internal combustion engine and the change-speed transmission mechanism to make the power shaft rotation speed of the internal combustion engine approach to the input shaft rotation speed of the change-speed transmission mechanism, and controlling the connection disconnection structure to connect the power shaft of the internal combustion engine with the input shaft of the change-speed transmission mechanism at the set fluid supply start timing.

2. A power output apparatus in accordance with claim 1, said power output apparatus further comprising:
    an acceleration-deceleration request setting unit that sets an acceleration-deceleration request to rotation of the driveshaft, wherein said start connection control module controls at least one of the internal combustion engine and the change-speed transmission mechanism based on the set acceleration-deceleration request to make the power shaft rotation speed of the internal combustion engine approach to the input shaft rotation speed of the change-speed transmission mechanism.

3. A power output apparatus in accordance with claim 2, wherein when the set acceleration-deceleration request represents an acceleration requirement, said start connection control module controls at least one of the internal combustion engine and the change-speed transmission mechanism to increase the power shaft rotation speed of the internal combustion engine above the input shaft rotation speed of the change-speed transmission mechanism by a preset first rotation speed, when the set acceleration-deceleration request represents a deceleration requirement, said start connection control module controlling at least one of the internal combustion engine and the change-speed transmission mechanism to decrease the power shaft rotation speed of the internal combustion engine below the input shaft rotation speed of the change-speed transmission mechanism by a preset second rotation speed.

4. A power output apparatus in accordance with claim 3, wherein said start connection control module controls at least one of the internal combustion engine and the change-speed transmission mechanism with the preset first rotation speed and the preset second rotation speed, based on a magnitude of the set acceleration-deceleration request.

5. A power output apparatus in accordance with claim 1, said power output apparatus further comprising:
a rotation behavior detection unit that detects a rotation behavior of the driveshaft; and
a learning module that learns the fluid supply start timing based on the rotation behavior of the driveshaft detected by the rotation behavior detection unit, in the control of the connection disconnection structure to connect the power shaft of the internal combustion engine with the input shaft of the change-speed transmission mechanism.

6. A power output apparatus in accordance with claim 5, wherein said learning module delays the fluid supply start timing in response to detection of a behavior for accelerating rotation of the driveshaft in the control of the connection disconnection structure to connect the power shaft of the internal combustion engine with the input shaft of the change-speed transmission mechanism,
said learning module advancing the fluid supply start timing in response to detection of a behavior for decelerating the rotation of the driveshaft in the control of the connection disconnection structure to connect the power shaft of the internal combustion engine with the input shaft of the change-speed transmission mechanism.

7. A power output apparatus in accordance with claim 1, said power output apparatus further comprising:
a fluid temperature measurement unit that measures temperature of the operating fluid; and
a timing correction module that corrects the fluid supply start timing, based on the measured temperature of the operating fluid.

8. A power output apparatus in accordance with claim 1, said power output apparatus further comprising:
an acceleration-deceleration behavior detection unit that detects an acceleration-deceleration behavior regarding acceleration or deceleration of rotation of the driveshaft; and
a driving force correction module that corrects a driving force output to the driveshaft based on the acceleration-deceleration behavior detected by the acceleration-deceleration behavior detection unit, in the control of the connection disconnection structure to connect the power shaft of the internal combustion engine with the input shaft of the change-speed transmission mechanism.

9. A vehicle driven with power output to one axle, said vehicle comprising:
an internal combustion engine that has a power shaft and outputs power to the one axle;
a change-speed transmission mechanism that has an input shaft connected to the power shaft of the internal combustion engine and an output shaft connected to the one axle and works to convert the output power of the internal combustion engine and transmit the converted power to the output shaft of the change-speed transmission mechanism;
a connection disconnection structure that utilizes a hydraulic pressure of an operating fluid to connect and disconnect the power shaft of the internal combustion engine with and from the input shaft of the change-speed transmission mechanism;
a power shaft rotation speed measurement unit that measures a power shaft rotation speed or a rotation speed of the power shaft of the internal combustion engine in the connection disconnection structure;
an input shaft rotation speed measurement unit that measures an input shaft rotation speed or a rotation speed of the input shaft of the transmission mechanism in the connection disconnection structure;
a start connection control module that, in response to a start-engagement operation command to restart the internal combustion engine and connect the power shaft of the internal combustion engine with the input shaft of the change-speed transmission mechanism from a stop state of the internal combustion engine and a disconnected state of the power shaft of the internal combustion engine from the input shaft of the change-speed transmission mechanism, controls the internal combustion engine to start, sets a fluid supply start timing to start a supply of the operating fluid to the connection disconnection structure, based on the measured power shaft rotation speed of the internal combustion engine and the measured input shaft rotation speed of the change-speed transmission mechanism,
said start connection control module controlling at least one of the internal combustion engine and the change-speed transmission mechanism to make the power shaft rotation speed of the internal combustion engine approach to the input shaft rotation speed of the change-speed transmission mechanism, and controlling the connection disconnection structure to connect the power shaft of the internal combustion engine with the input shaft of the change-speed transmission mechanism at the set fluid supply start timing.

10. A vehicle in accordance with claim 9, said vehicle further comprising:
an acceleration measurement unit that measures an acceleration of said vehicle; and
a driving force correction module that corrects a driving force required for said vehicle based on the acceleration measured by the acceleration measurement unit, in the control of the connection disconnection structure to connect the power shaft of the internal combustion engine with the input shaft of the change-speed transmission mechanism.

11. A vehicle in accordance with claim 10, wherein said driving force correction module corrects the driving force required for said vehicle in a direction of canceling out the measured acceleration.

12. A vehicle in accordance with claim 10, wherein said driving force correction module corrects a driving force output from the internal combustion engine.

13. A vehicle in accordance with claim 10, said vehicle further comprising:
a motor that is capable of outputting power to the one axle or another axle different from the one axle,
wherein said driving force correction module corrects a driving force output from the motor.

14. A vehicle in accordance with claim 9, said vehicle further comprising:
an acceleration-deceleration request setting unit that sets an acceleration-deceleration request to rotation of the one axle,
wherein said start connection control module controls at least one of the internal combustion engine and the change-speed transmission mechanism based on the set acceleration-deceleration request to make the power shaft rotation speed of the internal combustion engine approach to the input shaft rotation speed of the change-speed transmission mechanism.

15. A vehicle in accordance with claim 14, said vehicle further comprising:
wherein when the set acceleration-deceleration request represents an acceleration requirement, said start connection control module controls at least one of the internal combustion engine and the change-speed transmission mechanism to increase the power shaft rotation speed of the internal combustion engine above the input shaft rotation speed of the change-speed transmission mechanism by a preset first rotation speed,
when the set acceleration-deceleration request represents a deceleration requirement, said start connection control module controlling at least one of the internal combustion engine and the change-speed transmission mechanism to decrease the power shaft rotation speed of the internal combustion engine below the input shaft rotation speed of the change-speed transmission mechanism by a preset second rotation speed.

16. A vehicle in accordance with claim 15, wherein said start connection control module controls at least one of the internal combustion engine and the change-speed transmission mechanism with the preset first rotation speed and the preset second rotation speed, based on a magnitude of the set acceleration-deceleration request.

17. A vehicle in accordance with claim 9, said vehicle further comprising:
a rotation behavior detection unit that detects a rotation behavior of the one axle; and
a learning module that learns the fluid supply start timing based on the rotation behavior of the driveshaft detected by the rotation behavior detection unit, in the control of the connection disconnection structure to connect the power shaft of the internal combustion engine with the input shaft of the change-speed transmission mechanism.

18. A vehicle in accordance with claim 17, wherein said learning module delays the fluid supply start timing in response to detection of a behavior for accelerating rotation of the driveshaft in the control of the connection disconnection structure to connect the power shaft of the internal combustion engine with the input shaft of the change-speed transmission mechanism,
said learning module advancing the fluid supply start timing in response to detection of a behavior for decelerating the rotation of the driveshaft in the control of the connection disconnection structure to connect the power shaft of the internal combustion engine with the input shaft of the change-speed transmission mechanism.

19. A control method of a power output apparatus, said power output apparatus comprising: an internal combustion engine that has a power shaft and outputs power; a change-speed transmission mechanism that has an input shaft connected to the power shaft of the internal combustion engine and an output shaft connected to the drive shaft and works to convert the output power of the internal combustion engine and transmit the converted power to the output shaft of the change-speed transmission mechanism; and a connection disconnection structure that utilizes a hydraulic pressure of an operating fluid to connect and disconnect the power shaft of the internal combustion engine with and from the input shaft of the change-speed transmission mechanism,
said control method controlling the power output apparatus to restart the internal combustion engine and connect the power shaft of the internal combustion engine with the input shaft of the change-speed transmission mechanism from a stop state of the internal combustion engine and a disconnected state of the power shaft of the internal combustion engine from the input shaft of the change-speed transmission mechanism,
said control method comprising the steps of:
controlling the internal combustion engine to start;
setting a fluid supply start timing to start a supply of the operating fluid to the connection disconnection structure, based on a power shaft rotation speed or a rotation speed of the power shaft of the internal combustion engine and an input shaft rotation speed or a rotation speed of the input shaft of the change-speed transmission mechanism in the connection disconnection structure;
controlling at least one of the internal combustion engine and the change-speed transmission mechanism to make the power shaft rotation speed of the internal combustion engine approach to the input shaft rotation speed of the change-speed transmission mechanism; and
controlling the connection disconnection structure to connect the power shaft of the internal combustion engine with the input shaft of the change-speed transmission mechanism at the set fluid supply start timing.

* * * * *